United States Patent [19]

Crosby et al.

[11] 3,721,001

[45] March 20, 1973

[54] METHOD OF MAKING QUICK RESPONDING THERMOMETER

[75] Inventors: Philip C. Crosby, Wakefield; Robert J. Goyette, Chelmsford; Douglas M. Bauer, Danvers, all of Mass.

[73] Assignee: Council Commerce Corporation, Jericho, L.I., N.Y.

[22] Filed: Jan. 21, 1971

[21] Appl. No.: 108,615

[52] U.S. Cl. ..............................29/612, 73/362 AR
[51] Int. Cl. ...............................................H01c 7/04
[58] Field of Search.......29/612; 73/362 AR; 338/25, 338/28, 30

[56] References Cited

UNITED STATES PATENTS

| | | | |
|---|---|---|---|
| 2,753,714 | 7/1956 | Perkins et al. | 73/362 AR |
| 2,818,482 | 12/1957 | Bennett | 338/30 |
| 2,938,385 | 5/1960 | Mack et al. | 73/362 AR |
| 2,961,625 | 11/1960 | Sion | 73/362 AR X |
| 2,967,428 | 1/1961 | Burgert | 73/362 AR X |
| 3,177,560 | 4/1965 | Argamakoff | 29/612 |
| 3,431,781 | 3/1969 | Wiggin | 338/28 X |

*Primary Examiner*—Charles W. Lanham
*Assistant Examiner*—V. A. DiPalma
*Attorney*—Cesari and McKenna

[57] ABSTRACT

A process for making a quick-responding, thermally-sensitive, probe for use in a thermometer comprising placing an abradable thermally-sensitive element such as a thermistor in a probe and calibrating the element in place while using the wall of the probe to help support it and moderate the rate of abrasion. The novel device formed by this technique advantageously comprises a very thin wall constructed of a material of high thermal diffusivity which wall also acts as an electrical lead to an electronic temperature-measuring circuit.

8 Claims, 5 Drawing Figures

PATENTED MAR 20 1973  3,721,001
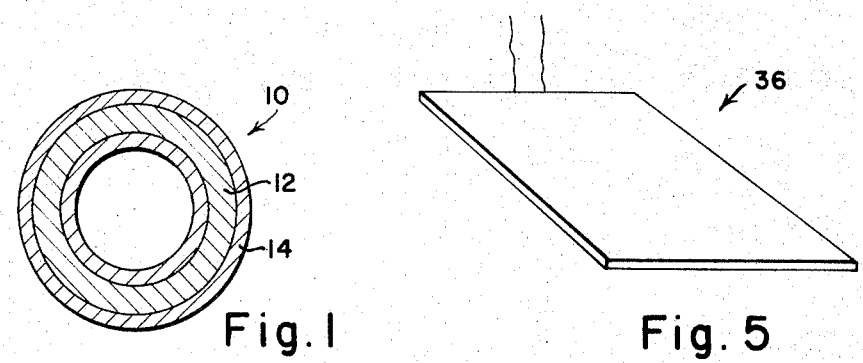
Fig. 1
Fig. 5
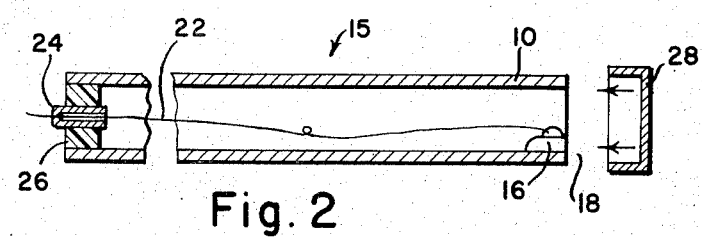
Fig. 2
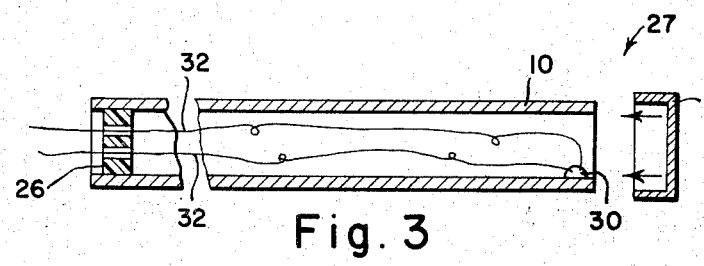
Fig. 3
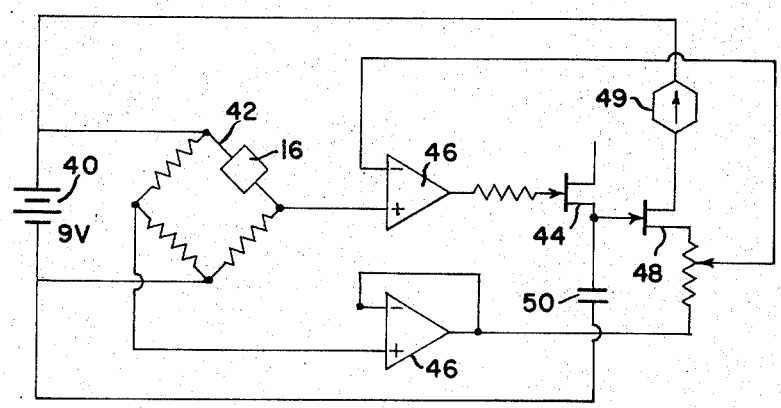
Fig. 4

METHOD OF MAKING QUICK RESPONDING THERMOMETER

BACKGROUND OF THE INVENTION

1. Field of the Invention

This invention relates to quick-responding temperature-sensing apparatus which is particularly useful for taking temperatures of patients in hospitals, etc.

2. The Prior Art

Most people are familiar with the conventional glass-tube thermometers used for measuring the temperature of patients in hospitals, doctor's offices and other such places. These thermometers enclose evacuated tubes in which various materials can expand to indicate, on a calibrated scale, the temperature of the patient.

Such devices have certain drawbacks. For example, it takes some minutes before they are heated sufficiently to equilibrate the glass and liquid contained therein at the temperature of the patient's mouth. It should be apparent that quick-responding thermometers are desirable. Nevertheless, there has not heretofore been a fully satisfactory solution to the problem of providing a suitably inexpensive, quick-responding temperature indicator that is sufficiently accurate to be generally acceptable. One problem has been to provide a quick-responding thermometer probe which would not dissipate an excessive quantity of heat (as by conduction, radiation, or both) along the length thereof and yet would be of sufficient mechanical strength to withstand normal handling and abuse. Another problem has been to provide a means for economically making such probes so that they can be "disposable".

SUMMARY OF THE INVENTION

Therefore, it is an object of the instant invention to provide an improved, quick-responding thermometer.

Another object of the invention is to provide a novel probe, or container, within which a thermosensitive element may be suitably contained.

A further object of the invention is to provide a novel process for making and calibrating a quick-responding thermosensitive device.

Still another object of the invention is to provide an improved read-out device for use in combination with the aforesaid thermosensitive device.

Other objects of the invention will be obvious to those skilled in the art on reading the instant application.

The above objects have been substantially achieved by making a quick-responding, thermally-sensitive, probe for use in a thermometer comprising placing an abradable, thermally-sensitive element such as a thermistor in a probe and calibrating it in place using the wall of the probe to help support it and moderate the rate of abrasion. The resulting probe is quick-responding and this attribute is assured by use of a novel container for enclosing the thermosensitive element. The thermally-sensitive element itself, when mounted in this container achieves the attributes of providing a quick and accurate response to the environment in which the probe is placed. However, it is necessary to assure a careful combination of the thermal properties, mechanical properties, and geometry of the probe in order to achieve the desired result.

One particularly advantageous probe comprises a thermistor within a bi-metallic wall. This container is formed of a thin wall of metal which wall is reinforced by a relatively thin layer of metal having very high mechanical strength. The inner material, when copper, comprises a major portion of the thickness of the wall of the container, preferably about 80 percent or more of its thickness. This arrangement accounts for the rapid response of a thermistor attached inside of the tube to heat flowing through the wall of the tube to the thermistor.

A small absolute cross-section of the inner metal minimizes the amount of heat which escapes away from the situs within the probe at which the temperature-sensitive element is located. The inner metal advantageously has a high heat conductivity but where the metal is thin enough so that the thermal lag therethrough is equivalent to that through 0.003 inches of copper, other metals may be used. Such a small cross-section of copper would be impractical from a structural point of view were it not for the reinforcing coat of metal.

The reinforcing metal is advantageously formed of two coatings, each less than 0.0002 inches thick.

The inner metal is preferably one having a heat conductivity of over about 0.65 calories per second per centimeter per degree Centigrade. Copper is preferred because of its superior mechanical properties, but gold and silver and highly conductive alloys are also advantageous.

Particularly advantageous metals for use in forming a metal coat are nickel-based metals, especially phosphorous-nickel alloys, e.g. those of 5–15 percent phosphorous. This phosphorous bearing nickel when applied in inner and outer coatings of 0.00015 inches thickness over a copper tube 0.002 inches in thickness will yield a tube two to five times stronger than when a 0.0003 inch coating of the nickel alloy is applied over the copper tubing. Moreover, such a material can be hardened to approximately the hardness of various carbide materials and thus has the additional advantage of being convertible into an extremely durable finish.

In practice, however, a gold flash is often used as a finish coat to provide minimum radiation characteristics and optimum corrosion resistance to the probe. The gold flash is typically only about 0.000001 inches thick. Other noble metals, such as rhodium and platinum, chrome, nickel, and the like may be used instead of gold in this application.

The reinforcing metal should be so selected that it at least doubles the yield strength of a copper tube having a 0.002 inch wall thickness when radial compressive forces are applied to such a tube having a 0.0002 inch inner and outer coatings of the reinforcing metal.

It has been discovered that probes formed of a single structural metal, can be utilized advantageously if somewhat longer response times, say times on the order of 10 to 20 seconds, can be tolerated for the thermally-sensitive element within the probe to reach thermal equilibrium with body temperatures.

Suitable probes may be constructed out of metal having a thermal diffusivity of above about 0.3. Thermal diffusivity is that quantity obtained by dividing the thermal conductivity by the heat capacity per unit weight per °C and by the density.

The geometry of the metallic portion of the probe must be carefully chosen. Probes should be constructed so that rates of heat flux through the walls thereof to heat flux along the walls thereof will not exceed the ratio obtained in a cylindrical metal probe having a maximum wall thickness of 0.005 inches in wall thickness and a maximum diameter of about 0.2 inches.

The metal probe should, in addition to having good thermal diffusivity and a thin wall section, have mechanical properties which allow it to resist distortion in the course of normal handling by hospital personnel, in being bitten upon by patients, and so forth. Construction of non-reinforced probes of very thin "soft" metals like gold and silver should be avoided.

The language in this specification talks of a "metal probe". What is meant by the term "metal probe" is a probe enclosing a thermally-sensitive element and comprising a metallic thermal path forming means to conduct heat across the path between the environment of the probe and the element. The parameters to be used limiting the flow of heat along the probe are set forth with reference to a model probe constructed as a metal cylinder. However, it will be obvious to those skilled in the art that the invention does not exclude from its scope those probes which use other configurations than cylindrical configurations or those probes wherein part thereof is formed of a non-metallic material, and so forth.

The rapid responding nature of the thermosensitive probe of the invention, and the relatively low thermal conductivity along the length thereof which is a consequence of the geometry of the probe, are most advantageous when the probe is in the form of a conventional elongate cylinder normally used in oral and rectal type thermometers. This is because the response of the device is so fast that when it is placed in a fleshy portion at the back of the mouth, it rapidly records the physiological temperature of interest. If placed near the front of the mouth, it would take some time for the subsequently-closed mouth (not the thermometer) to come to proper equilibrium.

Another advantage of the thermometer of the invention is the process by which it is conveniently made to have a tolerance of about plus-or-minus 0.1F°. One advantage of such accuracy is that it permits the manufacture of standard probes which are interchangeable with one another. This obviously facilitates replacement in the field.

Before the instant invention, thermometers using thermistors were generally assembled after the thermistor had been pre-calibrated. The pre-calibrated thermistor is normally protectively packaged — for example in an encapsulating resin — to assure that its original characteristics will not be changed by such mechanical abuse often encountered in normal manufacturing operations. Thermometers incorporating such devices have an undesirable thermal lag because of the presence of the encapsulating resin thereon.

ILLUSTRATIVE EMBODIMENT OF THE INVENTION

In this application and accompanying drawings are shown and described a preferred embodiment of the invention and various alternatives and modifications thereof, are suggested but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 is a cross section of a protective container of the temperature probe of the invention.

FIG. 2 is a schematic section of a thermosensitive probe constructed according to the invention.

FIG. 3 is a schematic section of an alternative thermosensitive probe constructed according to the invention.

FIG. 4 is a circuit diagram particularly useful in construction of a thermometer according to the invention.

FIG. 5 is another embodiment of the invention comprising a disk-like container for a thermosensitive probe.

Referring to FIG. 1, it is seen that tube 10 for enclosing a thermosensitive element is about 4.12 inches long, about 0.125-inch in diameter and formed of a 0.0017-inch cylinder formed of copper. This cylinder has, on either side thereof, a coating 14 of about 0.00015 inches of a phosphorous-bearing nickel sold under the trade designation En Plate Ni-410 by Enthone, Inc. and applied to the copper tube according to this manufacturer's instructions.

FIG. 2 shows a tube 10 comprising a thermistor 16 soldered to the inner wall 14 thereof. The thermistor 16 is positioned near an end 18 of tube 10 so the tube can act as a moderating resistance to the abrading of the thermistor during its calibration which abrading is carried out with the thermistor in position and which abrading includes the concurrent abrasion of a small portion of tube 10.

The thermistor is formed of a pressed, sintered, and silvered material which is identifiable as Material T commercially available from Fenwal Electronics, Inc., of Waltham, Massachusetts. Material T is used in making some of Fenwal's interchangeable curve-matched thermistors sold under the trade designation UNICURVE. The characteristics of the material are described in Fenwal's Bulletin L-6 relating to the aforesaid UNICURVE thermistors.

The thermistor 16 shown in FIG. 2 is suitably purchased as a disk 0.010 inches thick and 0.050 inches in diameter and then abraded to calibrate the thermistor for proper read out in a bridge circuit, e.g. the circuit shown in FIG. 4.

In the probe 15 shown in FIG. 2, the tube 10 forms one electrical lead from thermistor 16. The other electrical lead 22, soldered onto thermistor 16, is formed of a copper-clad iron-nickel alloy of the type known as Dumet wire. The material is particularly advantageous because the core thereof has a very low coefficient heat conductivity and thereby tends to allow a more rapid equilibration of thermistor 16.

Lead 22 is fastened through a crimp lead connector 24 which, in turn is held snugly within an insulator ring 26. A thin metal cap 28 is affixed onto tube 10 by use of a minimum quantity of epoxy adhesive. Cap 28 is not positioned until thermistor 16 has been carefully calibrated by abrasion with, for example, a 400-600 mesh silicon carbide abrasive paper.

FIG. 3 discloses another thermo-sensitive probe 27 constructed according to the invention, and comprising a tube 10 closed with a cap 28. Probe 27, however, comprises a small glass bead thermistor 30 connected to Dumet leads 32. The connection of leads to the thermistor 30 is effected by use of small quantites of a high thermally-conductive, dielectric, oxide-loaded epoxy such as that sold under the trade designation EC-COCOAT 582 by the Emerson & Cumming Company.

The circuit itself is calibrated to the thermistor to adapt probes of the type shown in FIG. 3, rather than calibrating the thermistor itself.

FIG. 5 shows a disk-shaped, thermosensitive probe 36 which is advantageous for some applications, e.g. where it is desired to monitor the temperature of a sleeping child by attaching the probe to the child's bed or bed linen. In such an application, the child's skin is not in contact with harmful adhesives used with most prior art devices.

The novel thermo-sensitive probes disclosed above, to be incorporated most advantageously in a thermometer in such a way as to take maximum advantage of the fast response thereof, may be utilized with the circuit described in FIG. 4.

This circuit has been found to minimize current drain on the capacitor used in a hold-circuit arrangement, to allow the use of less sensitive meter with a sensitive bridge circuit, to minimize the effect of self-heat in the thermistor by allowing use of very low bridge currents, to have good storage characteristics, i.e., to have capacitors with low-leakage characteristics, and to achieve the foregoing without seriously increasing the cost of the apparatus.

The circuit of FIG. 4 is characterized by use of a D.C. power source 40 to provide a regulated voltage to a Wheatstone bridge circuit 42 including therein a thermistor 16. The deviation across two operational amplifiers 46, whose relative drift character are self-compensating, drives a field effect transistor 48. A second field effect transistor 44 is placed in the circuit to avoid leakage from capacitor 50 and thus maintain a temperature reading on meter 49 during the period at which power is supplied from the voltage source. A certain number of equivalent circuit variations should be obvious to those skilled in the art. For example, the two operational amplifiers can be replaced by a single zero-drift device where such an arrangement is economical.

Although the circuit diagram is shown to include a memory feature, it will be obvious to those skilled in the art that this feature can be omitted without in anyway interfering with the advantages disclosed above.

It is to be understood that the following claims are intended to cover all of the generic and specific features of the invention herein described.

What is claimed is:

1. A process for forming a pre-calibrated, temperature-sensitive thermometer probe comprising the steps of
   a. placing a thermistor in a tube adjacent a metallic wall of said tube
   b. fastening said thermistor to said metallic wall so that a part of said thermistor is adjacent one end of said tube
   c. abrading said thermistor until it is properly calibrated and then
   d. closing said end of said conduit to form a probe enclosing said thermistor therein.

2. A process as defined in claim 1 wherein said fastening of said thermistor is achieved by placing said thermistor against an arcuate interior wall of said tube, and placing metallic solder between said wall and said thermistor.

3. A process as defined in claim 1 wherein said abrading of said thermistor is facilitated by simultaneously abrading said metallic wall of said tube, causing the structure of said wall to resist abrading and moderate the rate at which the thermistor is abraded.

4. A process as defined in claim 1 wherein said metallic wall of said tube is utilized as one electrical lead from said thermistor.

5. A process as defined in claim 2 wherein said metallic wall of said tube is utilized as one electrical lead from said thermistor.

6. A process as defined in claim 3 wherein said metallic wall is utilized as one electrical lead from said thermistor.

7. A process as defined in claim 2 wherein said abrading of said thermistor is facilitated by simultaneously abrading said metallic wall of said tube, thereby using said conduit to moderate the rate at which the thermistor is abraded.

8. A process as defined in claim 3 wherein said wall of said tube is less than about 0.005 inches thick.

* * * * *